Figure 1:
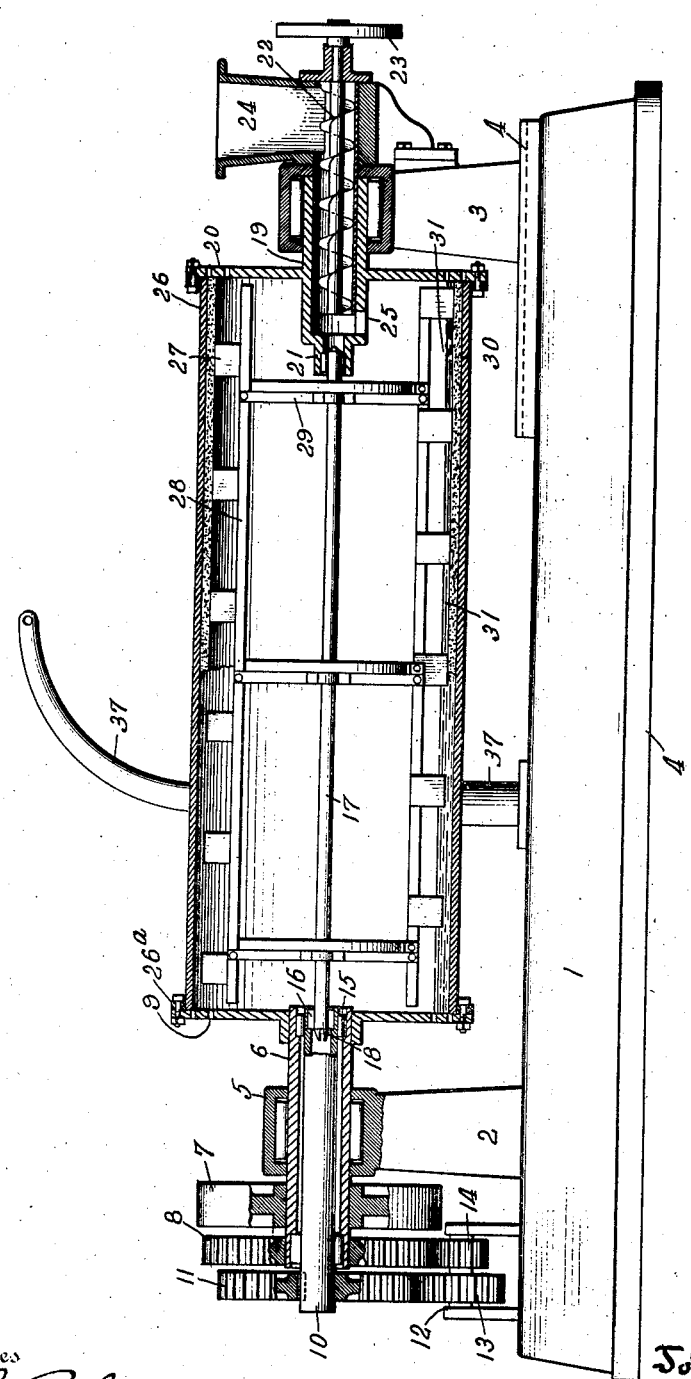

J. J. BERRIGAN.
PROCESS OF AND APPARATUS FOR MOLDING PLASTICS.
APPLICATION FILED OCT. 25, 1909.

994,496.

Patented June 6, 1911.

3 SHEETS—SHEET 1.

J. J. BERRIGAN.
PROCESS OF AND APPARATUS FOR MOLDING PLASTICS.
APPLICATION FILED OCT. 25, 1909.

994,496.

Patented June 6, 1911.

3 SHEETS—SHEET 2.

Witnesses

Inventor
John J. Berrigan
By K. P. McElroy.
Attorney

J. J. BERRIGAN.
PROCESS OF AND APPARATUS FOR MOLDING PLASTICS.
APPLICATION FILED OCT. 25, 1909.
994,496.
Patented June 6, 1911.
3 SHEETS—SHEET 3.
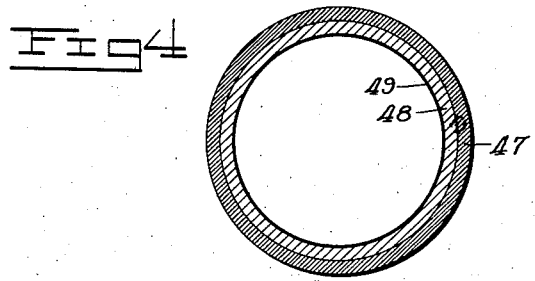
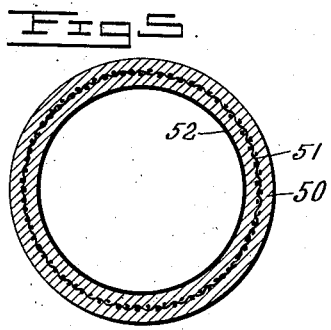
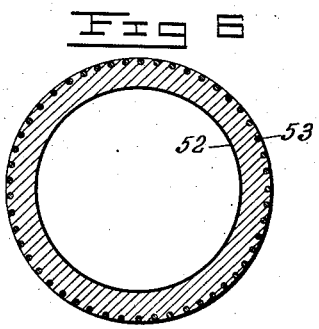
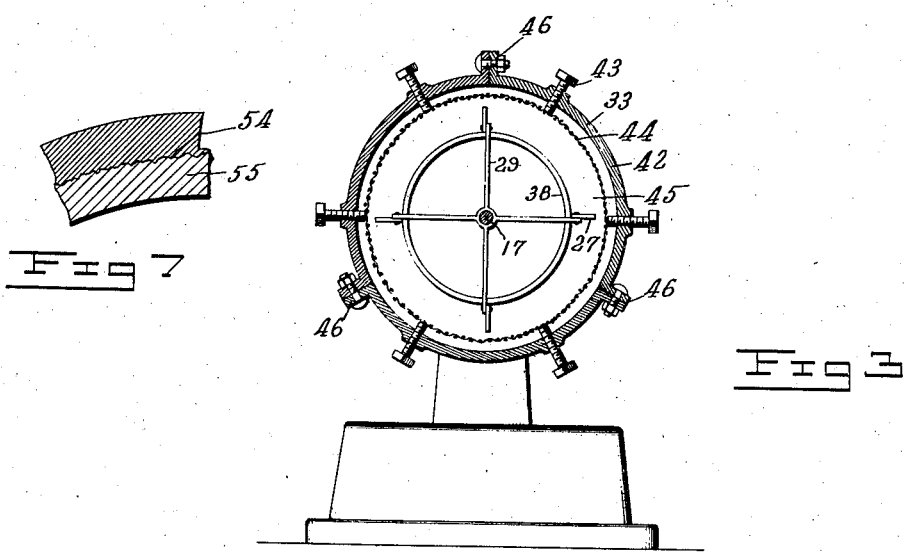
Witnesses
H. G. Polnietz
H. Schoenthal
Inventor
John J. Berrigan
By K. P. McElroy
Attorney

UNITED STATES PATENT OFFICE.

JOHN J. BERRIGAN, OF ORANGE, NEW JERSEY.

PROCESS OF AND APPARATUS FOR MOLDING PLASTICS.

994,496.  Specification of Letters Patent.  Patented June 6, 1911.

Application filed October 25, 1909. Serial No. 524,458.

*To all whom it may concern:*

Be it known that I, JOHN J. BERRIGAN, a citizen of the United States, residing at Orange, in the county of Essex and State of New Jersey, have invented certain new and useful Improvements in Processes of and Apparatus for Molding Plastics, of which the following is a specification.

This invention relates to processes of and apparatus for molding plastics; and it comprises a method of molding concrete and other settable plastics wherein the plastic material is centrifugally positioned and is subjected to centrifugal action during a molding operation; and it also comprises organizations of apparatus elements adapted for use in connection with such method, said organizations including means for securing a hollow body adapted for rotation about an included axis and adapted to receive and shape a plastic material, means for gradually supplying plastic material to the interior of said hollow body during rotation and means for producing a rapid rotation of said holding means and of said hollow body secured thereby; all as more fully hereinafter set forth and as claimed.

In the manufacture of set concrete articles a number of difficulties are met in producing comparatively thin molded layers of hard, dense, compact and impervious concrete. Portland cement and the like calcareous cementitious bodies when mingled in a powdered form with a small proportion of water take up this water, or hydrate with it, to form a hard solid body of set cement. There is but little change in volume in the setting, and the cement refuses to take up more than the amount of water necessary for its hydration, any excess separating as drops or bodies of liquid. Any water in excess separates as such and is not utilized. In making concrete, the cement and water are mingled as uniformly as possible with a relatively large amount of a granular filler or aggregate such as sand, gravel, rock chips, etc., and the mixture allowed to set. In hydrating, the cement is converted into a solid body permeating the mass and acting as a matrix or binder for the aggregate, linking the grains or pieces into a firm and permanent union. The relative amount of cement is preferably so adjusted that it just suffices to fill the voids between the pieces and particles of the aggregate. It will be obvious that in making compact and dense concrete it is desirable to use as little water as will suffice for the chemical change of the cement since the addition of more does no good and results in subsequent porosity. With an excess of water, in the ordinary methods of operating, more or less of it will remain as such separated bodies of liquid in the finished concrete, whence it evaporates in time, leaving the mass porous. But with only the amount of water requisite for the setting of the cement, the concrete mixture is not much more than merely moist and is as stiff and hard to handle as so much moist sand. In order to secure an intimate and uniform commingling of sand, water and cement, a long and laborious incorporation or working together of the mass is therefore necessary. Such an intimate and uniform commingling is of course a prerequisite for procuring dense and sound concrete; and for this purpose it is furthermore necessary that the working together shall as far as possible obliterate all voids and secure actual contact between the aggregate and the cement matrix at all points. And with a merely moist mixture the amount of labor required to attain this uniformity of composition and homogeneity of texture by working is extreme. And in shaping the resultant concrete, it must be tamped or compressed into the molds with the exertion of much force to secure dense, compact, full strength concrete. The employment of larger amounts of water facilitates the working and incorporation of the ingredients and also the subsequent molding operations to a degree proportional to the amount in excess, since the water renders the mixture fluent and easily worked. In the presence of water the particles of sand and cement are free to slide over each other. But this ease of working in the usual methods is at the expense of the quality of the concrete, that made with an excess of water being usually porous and of relatively low strength.

In the present invention, the advantages of both methods of operation are combined and certain new advantages are attained by the mode of operation adopted. A mixture is made of the cement and the desired amount of aggregate in the presence of sufficient water to make the composition freely fluent. This is more water than is required for the setting of the cement, but the excess here does no harm being later removed, and is even beneficial, as will later appear. Large excesses may be used if desired. With this fluent mixture, incorporation and working are easy and little labor is required to produce a thorough and uniform intermingling of aggregate and binder. The water acts as a lubricant permitting a free relative movement of the particles of aggregate and matrix. The mixture is next exposed in the form of relatively thin layers to a high degree of centrifugal force when the matrix and aggregate separate readily and positively from the excess of water, the concrete components being much heavier than the water and hence compacting against the interior wall of the apparatus employed in the form of a dense layer, free both of voids and of excess of water, while the water accumulates as an annular layer on the rear of the layer of concrete. Conceiving the layer of concrete mixture as made up of uniformly incorporated cement and sand, with the finer hydrating cement particles distributed over the faces of the sand grains, with drops or bodies of water between and separating the sand grains, it will be obvious that when the compound mass is subjected to a compacting centrifugal pressure the sand grains are free to move toward each other as if in a liquid bath so long as any spaces exist in which they can move. The water fills all the voids in the mixture as long as the voids exist, but as they disappear, the displaced water moves backward to join the water annulus. The difference between the specific gravity of sand and concrete and that of water is relatively large and, under proper conditions of operation, the separation of the excess of water is absolute, the layer of concrete retaining no more moisture than is required for the setting and becoming, therefore, completely compact and impervious. As stated, as long as any void exists it will be full of water and proximate particles will be free to move thereinto. This freedom of movement however exists only while the concrete is in relatively thin layers with the backing annulus of water. With a thicker layer the heavy centrifugal pressure acting on the rear of the layer may cause the rearward portions of the mass to press so solidly on the frontward portions as to prevent or impede relative movement. And since the great pressure acting on the material is purely radial, there is no tendency of the material to move laterally as a result. An annulus will form, but there is no tendency for the material to move longitudinally, that is, laterally as regards the annulus. In the embodiment of my invention as present preferred, the concrete material is therefore fed into the mold in relatively small successive portions and the annulus of compact concrete so formed is extended laterally longitudinally of the annulus. By the use of successive portions, so that the mass of concrete under pressure is not at any time very thick, the utility of the rear annulus of water back of the concrete annulus is enhanced and there is little danger of particles of the aggregate bridging other particles so as to permit the formation of permanent voids. This danger is further obviated by the lateral extension which produces a relative movement of the particles of concrete and aid materially in the compacting. Such lateral movement is of course through the annulus or wall of water. In a cylindrical rotating drum, the water will extend laterally along the length of the drum to form an annulus of the full length of such drum while the concrete will not so extend without mechanical aid. In this method of operation where the concrete mixture is added in successive portions there is the additional advantage that no opportunity is afforded for segregation of the heavier and less heavy portions of the aggregate as distinct layers. Cement and aggregate are deposited in the apparatus in a state of substantially uniform admixture and do not again segregate. The centrifugal pressure employed is preferably rather high. The apparatus may, for instance, rotate at about 500 revolutions per minute. Under these conditions, the concrete is not only exposed to high pressure but is exposed to this pressure in the presence of lubricating water; is compressed while in a relatively fluent condition. The apparatus employed may be any that is suitable for this purpose. Where the concrete is designed to form a permanent lining, the article to be lined, such as a pipe or a tank, may be given a rapid rotation about an included axis and the concrete mixture fed therein. Where a molded article is to be formed, the rotating body may be the mold itself, or may be a casing carrying the molds proper.

For lining pipes and tanks, the described process has a number of very important advantages. The lining of concrete may be as thin as may be desired but will still be dense, hard and impervious. And since it is forced against the inner surface of the pipe or tank under high pressure, it keys positively and effectually into all the superficial irregularities, forming a positive union. Being produced under outward pressure, after setting the arched layer of concrete retains the stress under which it was formed, and behaves as if the pipe had been shrunk on. A convenient method of operation is to introduce the concrete mixture at one end of the pipe and carry it forward by the action of a conveyer. This conveyer may conveniently carry a number of angularly set blades each operating to force the concrete forward toward the other end of the pipe. The mass of concrete at the end where it is introduced is carried forward and leveled off until a uniform annular layer of concrete is formed from end to end of the tank or pipe. In doing this, the conveyer blades also operate to give the material a glass-like smooth surface, and promote very much the compacting of the layer in the extension laterally of the annulus first formed. At the point where the fluent mixture of concrete materials and water is introduced, the solids and the water tend to form concentric annuli. The water annulus extends throughout the length of the pipe or tank while the concrete annulus is pushed forward through this liquid annulus toward the opposite end of the pipe or tank by the conveyers until it attains the requisite thickness. This layer of concrete being formed in the presence of a layer of water is very easily manipulated and no trouble is experienced in handling it with the conveyer. Should there be voids in the concrete layer, these voids become filled with water and the movement of the concrete particles into the void is facilitated, while the water is readily displaced by such particles. Practically in the described operation the advantages of handling fluent wet concrete are retained while the concrete produced is even denser than that which can be produced from a merely moist concrete mixture. The enormous energy of centrifugal action is utilized to the fullest extent in working the concrete layer.

For lining pipes and tanks any suitable aggregate may be employed with the cement but this aggregate is preferably fine grained. Either sand or rock powder may be employed but advantageously a mixture of both is used as having a less percentage of voids and requiring less cement than is the case with either sand or rock powder alone. The ratio between the cement and aggregate may be as desired. 1 part of cement to 3, 4, 5, 6 or 7 parts of aggregate is suitable. Because of its structure the concrete lined pipe or tank so produced may also be regarded as a reinforced concrete article, the exterior metal forming a reinforcing casing.

The described method may also be employed for the manufacture of reinforced concrete pipes, tanks and other vessels containing incorporated metal. By using for the rotating hollow body a separable mold and spacing expanded metal, wire gauze, netting or other form of reticulated metal therewithin and proceeding as just indicated, a reinforced concrete tube is produced. After the concrete is set the mold can be removed. This will give a dense, compact, very strong reinforced concrete hollow article.

The described method may also be employed for making other than hollow articles as for instance, by providing the interior of a rotating casing with suitable mold bodies. By placing within the casing a series of cubical molds, concrete bricks may be so made.

In the described method, the working forward by the conveyers gives the plastic material a hard, finished, impervious interior surface, the material just below the sweep of the blade not being moved forward by it and the other material traversing the sole so formed. In this molding operation, the lining formed of course takes the contour of the conveying means. In employing concrete mixtures, after forming the main body of the article or lining, a little cement mixture of different composition, as for instance cement with one or two parts very fine sand, or simple neat cement and water, may be fed in to give a hard, polished, glass-like surface, very impervious and very resistant to corrosion. Such a smooth surface is quite desirable in water pipes as lessening friction.

In the accompanying illustration I have shown, more or less diagrammatically, certain embodiments of the described invention.

Figure 2:
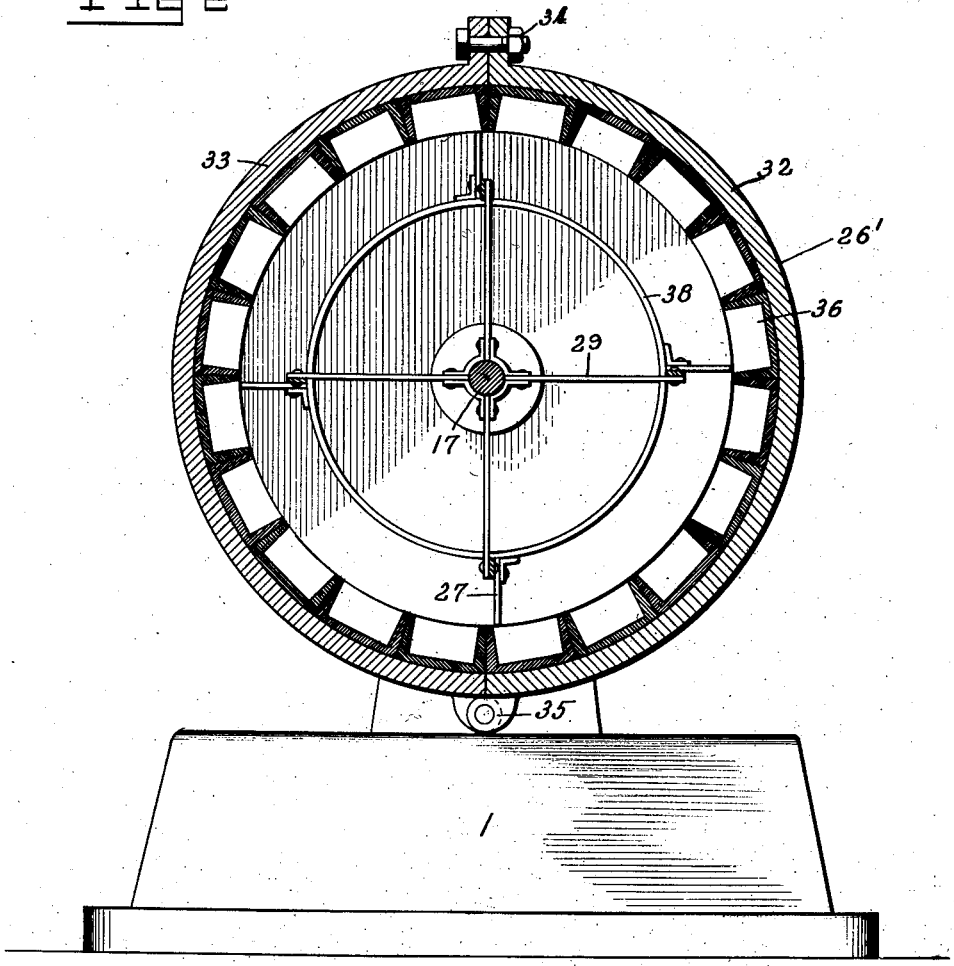

In this showing:—Figure 1 is a vertical longitudinal section of a complete apparatus; Fig. 2 is a transverse section of a mold body for making bricks or tiles; Fig. 3 is a transverse section of a mold for making reinforced tubing; Fig. 4 is a transverse section of a lined tube; Fig. 5 is a similar section of a reinforced tube; Fig. 6 is a modified form of the same; and Fig. 7 is a fragmentary view showing the union between concrete and iron.

In the showing of Fig. 1, element 1 is a suitable base supporting the pedestals 2 and 3, the latter being slidably mounted as at 4. Journaled in the former at 5 is a short hollow shaft 6 carrying a pulley wheel 7 and gear wheel 8. At the other end this shaft is rigid with head 9 and is adapted to impart rotary motion thereto. Within the hollow shaft is journaled a short stub shaft 10 carrying gear 11. This gear meshes with pinion 13 carried on shaft 12 and actuating pinion 14 which meshes with the gear carried by the hollow shaft. Roller bearings 15 may be interposed between hollow shaft and the stub shaft. At its end the stub shaft is recessed at 16 to accommodate the end of a removable conveyer shaft 17 held in place by cotter pin 18. At the other end of the apparatus a hollow shaft 19 is rigidly secured to head 20, and is journaled in the described movable pedestal. This hollow shaft at one end carries a bearing 21 for the other end of the described conveyer shaft. Within this hollow shaft operates a conveyer 22 driven by wheel 23, receiving material from hopper 24 and feeding the same out through radial outlet 25 in said hollow shaft. Between the described heads (9 and 20)

may be secured a cylindrical element 26, this element being either a pipe or tank to be lined or a mold. Cylinders of various sizes may be secured between the two heads by bolted lugs 26ª, and by the adjustability of the end pedestal, similarly, cylinders of various lengths may be accommodated. Within the cylinder operates a conveyer, shown as a series of angularly set plates 27 mounted on bars 28 which are carried by radial arms 29 from the stated conveyer shaft. 30 indicates a layer of concrete within the pipe or mold and 31 a backing annulus of water.

In the showing of Fig. 2 the cylinder part 26' is made of two halves 32 and 33 secured together by bolt 34 and pivoted or hinged at 35. Within this mold body are set a number of block molds 36. The mold body may be swung into and out of position by any simple form of swinging crane, such as that shown at 37 in Fig. 1. The inner conveyer may be strengthened by disk or ring 38.

In Fig. 3 a mold 42 is shown as provided with adjustable threaded members 43 by which a layer of reinforcing metal may be positioned within the mold at a distance from its walls in making a reinforced tubular body. For convenience in removing the object so formed from the mold proper, the latter may be made in three parts secured together as at 46.

In Fig. 4 is shown diagrammatically a section of a lined iron pipe, the pipe proper being shown at 47, the layer of plastic at 48 and the described planished interior layer at 49. 49 may be indicated either by the smoothed surface of the layer itself or a layer of different material, such as a layer of neat cement.

In Fig. 5 is shown a reinforced concrete pipe or tank, the concrete being indicated by 50, the reinforcement by 51 and the interior planished layer by 52.

Fig. 6 shows the concrete body provided with exterior reinforcement 53.

In Fig. 7 is shown diagrammatically on an enlarged and exaggerated scale the bonding or keying between the irregularities 54 of an iron pipe and the concrete layer 55.

The described method and apparatus may of course be employed for making articles of other plastics than concrete and for lining articles with such other plastics. For instance, the article may be made of or lined with hot fluent asphalt introduced and handled in the same manner as the concrete mixture. Water glass admixtures can also be used, as may a wide variety of other suitable plastics. In making the concrete other calcareous cements than Portland cement may be used; as for instance plaster of Paris. For Portland cement may be substituted any of the other cements of the same type, such as natural cement, slag cement, pozzuolana cement, etc. Simple lime mortar may be used for some articles, and the set plastics may be afterward treated with a hardening material, such as alum or water glass. Portland cement may of course receive admixtures of lime.

For the sake of simplicity of illustration, the plastic mixture is shown as introduced at only one point, but it may of course be introduced at several, and the resulting plurality of plastic annuli laterally extended till they join to produce the complete annulus of plastic material. In doing this however, the apparatus is necessarily more complicated than the simple types shown; and with concrete there is moreover no special advantage in such an introduction at a plurality of points, it being possible in the present invention to employ a thin and fluent watery mixture while securing all the advantages of a thicker, stiffer mixture as regards the density of the set concrete.

What I claim is:—

1. The process of molding plastics which comprises gradually feeding a mass of plastic material into the interior and upon the inner wall of a rotating hollow member at one point, said hollow member having a sufficient rate of rotative speed to centrifugally position said material on its inner wall, and gradually extending the material laterally from said point along said wall.

2. The process of molding plastics which comprises gradually feeding a fluent mass of material comprising a calcareous cement and water into the interior and upon the inner wall of a rotating hollow member at one point, said hollow member having a sufficient rate of rotative speed to centrifugally position said material on its inner wall, and gradually extending the material laterally from said point along said wall.

3. The process of molding plastics which comprises gradually feeding a fluent mass of material comprising a calcareous cement, water and a filler into the interior and upon the inner wall of a rotating hollow member at one point, said hollow member having a sufficient rate of rotative speed to centrifugally position said material on its inner wall, and gradually extending the material laterally from said point along said wall.

4. The process of molding plastics which comprises forming a gradually replenished, centrifugally positioned annulus of plastic material and gradually extending the material of said annulus laterally from the point of replenishment.

5. The process of molding plastics which comprises forming a gradually replenished, centrifugally positioned annulus of plastic material comprising a calcareous cement and water, and gradually extending the material of said annulus laterally from the point of replenishment.

6. The process of molding plastics which comprises forming a gradually replenished, centrifugally positioned annulus of plastic material in contact with reinforcing metal and gradually extending the material of said annulus laterally along said reinforcing metal from the point of replenishment.

7. The process of molding plastics which comprises forming a gradually replenished, centrifugally positioned annulus of plastic material comprising a calcareous cement and water, in contact with reinforcing metal and gradually extending the material of said annulus laterally along said reinforcing metal from the point of replenishment.

8. The process of molding plastics which comprises forming a gradually replenished, centrifugally positioned annulus of plastic material comprising a calcareous cement, water and filler in contact with reinforcing metal and gradually extending the material of said annulus laterally along said reinforcing metal from the point of replenishment.

9. The process of molding plastics which comprises forming a gradually replenished, centrifugally positioned annulus of plastic material in contact with and interiorly of a layer of reinforcing metal and gradually extending the material of said annulus laterally along said reinforcing metal from the point of replenishment.

10. The process of molding plastics which comprises forming a gradually replenished, centrifugally positioned annulus of plastic material comprising a calcareous cement and water, in contact with and interiorly of a layer of reinforcing metal and gradually extending the material of said annulus laterally along said reinforcing metal from the point of replenishment.

11. The process of molding plastics which comprises forming a gradually replenished, centrifugally positioned annulus of plastic material comprising a calcareous cement, water and filler in contact with and interiorly of a layer of reinforcing metal and gradually extending the material of said annulus laterally along said reinforcing metal from the point of replenishment.

12. The process of providing hollow bodies with a lining of plastic material which comprises rotating such a body about its axis, forming a gradually replenished, centrifugally positioned annulus of plastic material at one point on the inner wall of said hollow body and gradually extending the material of said annulus laterally until said body is provided with the desired thickness of lining.

13. The process of providing hollow bodies with a lining of plastic material comprising a calcareous cement which comprises rotating such a body about its axis, forming a gradually replenished, centrifugally positioned annulus of plastic material at one point on the inner wall of said hollow body and gradually extending the material of said annulus laterally until said body is provided with the desired thickness of lining.

14. The process of providing hollow bodies with a lining of plastic material comprising a calcareous cement and filler which comprises rotating such a body about its axis, forming a gradually replenished, centrifugally positioned annulus of plastic material at one point on the inner wall of said hollow body and gradually extending the material of said annulus laterally until said body is provided with the desired thickness of lining.

15. The process of providing hollow bodies with a lining of plastic material which comprises rotating such a body about its axis, gradually introducing plastic material at one point in its inner periphery and gradually extending said plastic material laterally along said periphery until it forms a complete lining.

16. The process of providing hollow bodies with a concrete lining which comprises rotating such a body about its axis, introducing a fluent mixture comprising cement and water at a point on its inner periphery thereby forming a liquid and a solid annulus and gradually extending the solid annulus under the liquid annulus laterally along said periphery from the point of introduction until a complete lining is formed.

17. The process of providing hollow bodies with a concrete lining which comprises rotating such a body about its axis, introducing a fluent mixture comprising cement and water at a point on its inner periphery thereby forming a liquid and a solid annulus, gradually extending the solid annulus under the liquid annulus laterally from such point until a complete lining is formed and frictionally polishing the interior of said lining during the lateral extension of said annulus.

18. The process of molding calcareous plastics which comprises forming a gradually replenished, centrifugally positioned annulus of cementitious material comprising a filler upon the interior of a rapidly rotating hollow body, gradually extending said annulus laterally until a uniform layer of the desired thickness is produced, and then introducing cementitious material of different composition and extending the same laterally over the first stated layer to form a thin facing layer thereupon.

19. The process of molding calcareous plastics which comprises forming a gradually replenished, centrifugally positioned annulus of cementitious material comprising a filler upon the interior of a rapidly rotating hollow body, gradually extending said annulus laterally until a uniform layer of the desired thickness is produced, and then introducing cement and water and extending the same laterally over the first stated layer to form a thin facing layer thereupon.

20. In a plastic molding apparatus, means for rotating a hollow body about an included axis, means for introducing a plastic mixture at one point on its inner periphery and means for extending the material of said plastic laterally along said periphery over the interior of said hollow body.

21. In a plastic molding apparatus, means for rotating a hollow body about an included axis, means for introducing a plastic mixture at one point on its inner periphery and conveying means comprising conveyer blades spaced away from said periphery for extending the material of said plastic laterally over the inner periphery.

22. In a plastic molding apparatus, means for rotating a hollow body about an included axis, means for introducing a plastic mixture at one point on its inner periphery and an independently rotatable bladed conveyer within said hollow body having blades spaced away from its inner wall.

23. In a plastic molding apparatus, a pair of rotatable heads adapted to engage the ends of a tubular casing, means for rotating said heads and casing, means for introducing a plastic material through one of said heads into said casing, and an independently rotatable bladed conveyer having blades reaching to a point somewhat short of the interior of said casing located between said heads.

24. In a plastic molding apparatus, a pair of rotatable heads adapted to engage and disengage the ends of a tubular casing and impart rotation thereto, means for rotating said heads, means for introducing plastic material through one of said heads, rotatable conveying means adapted for a journaled engagement with and between said heads and means for giving said conveying means a rotation independent of that of said heads.

25. In a plastic molding apparatus, a pair of rotatable heads adapted to engage and disengage the ends of the tubular casing and impart rotation thereto, means for rotating said heads, means for adjusting one of said heads at variable distances from the other said head, means for introducing plastics through one of said heads, rotatable conveying means adapted for a journaled engagement with and between said heads and means for giving said conveying means a rotation independent of that of said head.

26. The process of lining a rotative hollow body provided with revoluble interior conveyer means which comprises placing said hollow body and said conveyer in differential rotary motion, said hollow body being rotated at a sufficient rate of speed to cause centrifugal action therein, feeding plastic concrete material against an interior point of the hollow body and continuing the feed until centrifugal action and the laterally extending action of the conveyer means coöperate to form a smooth surfaced lining conforming in contour to said conveyer means, discontinuing the feed and allowing the concrete to harden.

27. The process of lining a rotative hollow body provided with revoluble interior conveyer means which comprises placing said hollow body and said conveyer in differential rotary motion, said hollow body being rotated at a sufficient rate of speed to cause centrifugal action therein, feeding plastic concrete material against an interior point of the hollow body and continuing the feed until centrifugal action and the laterally extending action of the conveyer means coöperate to form a smooth surfaced lining conforming in contour to said conveyer means, a finer grained material being introduced toward the end of the feeding operation to form a finer grained surface, discontinuing the feed and allowing the concrete to harden.

In testimony whereof, I affix my signature in the presence of witnesses.

JOHN J. BERRIGAN.

Witnesses:
   JOHN S. PAUL,
   H. E. BENEDICT.